US012721260B2

(12) United States Patent
Tian

(10) Patent No.: US 12,721,260 B2
(45) Date of Patent: Sep. 1, 2026

(54) WALK-BEHIND MOWER

(71) Applicant: Greenworks (Jiangsu) Co., Ltd., Changzhou (CN)

(72) Inventor: Bing Tian, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 454 days.

(21) Appl. No.: 18/261,670

(22) PCT Filed: Jan. 25, 2022

(86) PCT No.: PCT/CN2022/073604
§ 371 (c)(1),
(2) Date: Jul. 16, 2023

(87) PCT Pub. No.: WO2022/161326
PCT Pub. Date: Aug. 4, 2022

(65) Prior Publication Data

US 2024/0099189 A1 Mar. 28, 2024

(30) Foreign Application Priority Data

Jan. 26, 2021 (CN) ......................... 202110102183.8
Jan. 26, 2021 (CN) ......................... 202110102272.2
(Continued)

(51) Int. Cl.
*A01D 34/685* (2006.01)
*A01D 34/71* (2006.01)
(Continued)

(52) U.S. Cl.
CPC ........... *A01D 34/685* (2013.01); *A01D 34/71* (2013.01); *A01D 34/78* (2013.01)

(58) Field of Classification Search
CPC .............. A01D 2101/00; A01D 34/005; A01D 34/685; A01D 34/71; A01D 34/78; A01D 34/81
See application file for complete search history.

(56) References Cited

U.S. PATENT DOCUMENTS 2,719,396 A * 10/1955 Morris .................. A01D 34/71 56/12.2
2,775,087 A * 12/1956 Abel .................... A01D 34/822 56/16.7
(Continued)

FOREIGN PATENT DOCUMENTS

CN 102388720 A * 3/2012 ........... A01D 34/685
CN 110839395 A * 2/2020 ............. A01D 34/66
(Continued)

*Primary Examiner* — Adam J Behrens

(57) ABSTRACT

A lawn mower includes a cutter assembly, a housing, and a power assembly supplying power for the cutter assembly. The cutter assembly includes a first/second blade. The first blade and the second blade are staggered and arranged back and forth. The housing includes a mowing space. The mowing space includes a first/second mowing cavity communicating with each other and respectively housing the first/second blade. A width of the mowing space is greater than a width of the first/second mowing cavity, and is smaller than a sum of the widths of the first mowing cavity and the second mowing cavity. An overlapping part is provided by overlapping of cutting areas of the first and second blades. A ratio of a width of the overlapping part to the width of the mowing space is from 0.01 to 0.09.

19 Claims, 8 Drawing Sheets

(30) Foreign Application Priority Data

Jan. 26, 2021 (CN) ........................ 202120209467.2
Jan. 26, 2021 (CN) ........................ 202120209469.1
Jan. 26, 2021 (CN) ........................ 202120209537.4

(51) Int. Cl.
*A01D 34/78* (2006.01)
*A01D 34/81* (2006.01)

(56) References Cited

U.S. PATENT DOCUMENTS 3,142,950 A * 8/1964 West .................... A01D 34/822 56/DIG. 18
3,245,209 A * 4/1966 Marek .................... A01D 34/66 D15/15
3,496,707 A * 2/1970 Kobey .................. A01D 34/63 56/17.5
4,055,036 A * 10/1977 Kidd ..................... A01D 34/71 56/13.6
4,335,567 A * 6/1982 Comer ................. A01D 43/063 56/13.4
4,424,661 A * 1/1984 Kulak ................. A01D 34/685 56/13.6
4,466,235 A * 8/1984 Cole ..................... A01D 34/81 56/16.9
4,856,265 A * 8/1989 Wolf .................... A01D 34/685 56/6
5,085,044 A * 2/1992 Freier, Jr. ............ A01D 34/685 56/16.9
5,133,176 A * 7/1992 Baumann ............ A01D 34/005 56/320.1
5,197,265 A 3/1993 Hiratsuna et al.
5,205,112 A * 4/1993 Tillotson .............. A01D 34/685 56/DIG. 17
5,212,938 A * 5/1993 Zenner ................. A01D 34/685 56/320.1
5,214,906 A * 6/1993 Saki ..................... A01D 34/685 56/13.6
5,267,429 A * 12/1993 Kettler ................. A01D 34/005 56/320.2
5,894,717 A * 4/1999 Yamashita ........... A01D 34/005 56/320.1
6,026,635 A * 2/2000 Staiger ................. A01D 34/736 56/295
6,101,794 A * 8/2000 Christopherson ...... A01D 34/71 280/124.179
6,178,729 B1 * 1/2001 Vastag ................ A01D 34/005 56/255
7,574,852 B1 * 8/2009 Loxterkamp ........ A01D 34/667 56/320.2
8,191,343 B1 * 6/2012 Hauser .................. A01D 69/02 56/11.9
9,756,788 B1 * 9/2017 Hauser .................. B60L 3/0061
10,433,481 B2 * 10/2019 Welsh .................... A01D 34/81
11,518,234 B1 * 12/2022 Keller .................... A01D 69/08
11,712,001 B2 * 8/2023 Zeiler .................... A01D 34/82 56/17.5
2010/0031620 A1 * 2/2010 Uemura ............... A01D 42/005 56/14.7
2010/0281838 A1 * 11/2010 Walker ................ A01D 34/005 56/14.7
2013/0212995 A1 * 8/2013 Ebihara .................. A01D 34/71 56/10.5
2014/0075900 A1 * 3/2014 Moroi ................. A01D 34/005 56/2
2014/0123615 A1 * 5/2014 Wadzinski ......... A01D 43/0636 56/16.8
2016/0192586 A1 * 7/2016 Nishihara ............. A01D 34/73 56/255
2017/0208741 A1 * 7/2017 Carlson ................ A01D 34/736
2018/0160623 A1 * 6/2018 Welsh .................... A01D 34/81
2019/0335656 A1 * 11/2019 Weems ................ A01D 34/664
2021/0015037 A1 * 1/2021 Wu ...................... A01D 34/685
2021/0274711 A1 * 9/2021 Henry .................. A01D 42/005
2021/0329833 A1 * 10/2021 Steiner .................. A01D 34/52

FOREIGN PATENT DOCUMENTS

EP 0756814 A1 * 2/1997 ............. A01D 57/01
EP 2119337 A1 * 11/2009 ........... A01D 34/828
WO WO-2013007097 A1 * 1/2013 ........... A01D 34/685
WO WO-2015055724 A1 * 4/2015 ............. A01D 34/81
WO WO-2021076737 A1 * 4/2021 ............. A01D 34/78

* cited by examiner

WALK-BEHIND MOWER

TECHNICAL FIELD

The disclosure relates to a technical field of landscaping machinery, specifically relates to a lawn mower.

BACKGROUND

The lawn mower is a mechanical tool commonly used for trimming and maintaining lawns and vegetation, which is mainly used in garden decoration trimming, grass greening trimming, urban streets, greening scenic spots, pastoral trimming, field weeding and other fields, especially for large-scale trimming of grass, football fields, private villa gardens, golf courses, etc.

Lawn mowers are generally provided with grass collection and grass shredding modes. In the grass collection mode, a mowing cavity of the lawn mower is communicated with a collection bag, mowed grass enters the collection bag under an action of centrifugal force and is collected. In the grass shredding mode, a passage between the mowing cavity of the lawn mower and the collection bag is closed. Before the mowed grass fell, it was hit by a high-speed rotating mowing blade several times to be shredded, and finally spread on the ground.

Conventional lawn mowers are general single-blade lawn mowers. A mowing range of the single-blade lawn mower is small, which causes low mowing efficiency. Moreover, during mowing, grass is overwhelmed by a housing and cannot enter the mowing cavity for mowing effectively, which may cause problems such as missed mowing or insufficient mowing. This results in uneven spraying in the grass shredding mode and uncomplete grass collection in the grass collection mode, which causes an unsightly lawn surface and seriously affects grass collection and grass shredding effects of the lawn mower.

In view of this, it is indeed necessary to provide an improved lawn mower.

SUMMARY

The disclosure provides a lawn mower with improved grass shredding and grass collection effects.

The disclosure provides a lawn mower. The lawn mower includes: a cutter assembly, a power assembly, and a housing. The cutter assembly includes a first blade and a second blade. The first blade and the second blade are staggered and arranged back and forth. The power assembly supplies power to the cutter assembly. The housing includes a mowing space configured to house the cutter assembly. The mowing space includes a first mowing cavity and a second mowing cavity. The first blade is located in the first mowing cavity and the second blade is located in the second mowing cavity, and the first mowing cavity and the second mowing cavity are configured to communicate with each other. A width of the mowing space is greater than a width of the first mowing cavity or a width of the second mowing cavity, and is smaller than a sum of the widths of the first mowing cavity and the second mowing cavity. An overlapping part is provided by overlapping of cutting areas of the first blade and the second blade in a front and rear direction of the lawn mower, and a ratio of a width of the overlapping part to the width of the mowing space is from 0.01 to 0.09.

As a further improvement of the disclosure, a connecting line of rotation centers of the first blade and the second blade defines a first angle with the front and rear direction of the lawn mower, and the first angle is from 30 degrees to 90 degrees.

As a further improvement of the disclosure, the width of the overlapping part is greater than or equal to 10 mm and less than or equal to 35 mm.

As a further improvement of the disclosure, the housing includes a top wall and a peripheral wall extending downward from an edge of the top wall, the top wall and the peripheral wall define the mowing space to house the cutter assembly, the power assembly passes through the housing and is connected with the cutter assembly, the peripheral wall includes a side wall and a front wall, a step part is arranged between the side wall and the front wall, and the step part is gradually lowered in a direction from the side wall to the front wall.

As a further improvement of the disclosure, the peripheral wall includes two side walls, the two side walls are symmetrically arranged, the front wall is located between the two side walls, and the step part is arranged between the front wall and each of the side walls.

As a further improvement of the disclosure, a distance of the front wall to ground is greater than a distance of the side wall to the ground.

As a further improvement of the disclosure, a height of the step part in a vertical direction is from 5 mm to 30 mm.

As a further improvement of the disclosure, a width of the front wall is from 200 mm to 700 mm.

As a further improvement of the disclosure, a distance of a lowest point on the side wall to the ground is less than 1 cm.

As a further improvement of the disclosure, in a direction of the height of the stepping mower, a height difference of the first blade or the second blade and a lowest point of the deflection component is greater than 5 mm.

As a further improvement of the disclosure, the power assembly includes a first motor and a second motor, the first motor and the second motor are respectively connected with the first blade and the second blade, and a distance between motor shafts of the first motor and the second motor is greater than a sum of radii of the first blade and the second blade.

As a further improvement of the disclosure, the first blade is driven by the first motor to define a rotation plane in the mowing space, the second blade is driven by the first motor to define a rotation plane in the mowing space, rotation speeds of the first motor and the second motor are from 3200 r/min to 3600*r*/min, and linear velocities of the first blade and the second blade are from 65 m/s to 80 m/s.

As a further improvement of the disclosure, there is a gap between a tip of the first blade and an inner wall of the first mowing cavity, there is a gap between a tip of the second blade and an inner wall of the second mowing cavity, and the gaps are greater than 5 mm and less than 15 mm.

As a further improvement of the disclosure, the first blade is closer to a front end of the lawn mower than the second blade, rotation directions of the first blade and the second blade are opposite, and a size of the first blade is larger than a size of the second blade.

As a further improvement of the disclosure, deflection components are arranged in the first mowing cavity and the second mowing cavity, the deflection component is connected with the top wall and extends downwardly and inwardly from the top wall.

As a further improvement of the disclosure, in a direction of the height of the lawn mower, a lowest point of the deflection component is located above a rotation plane of the first blade or the second blade.

As a further improvement of the disclosure, a connecting line between a center of the deflection component and a center of the first blade and a connecting line between an edge of the housing and the center of the first blade define a second angle, a connecting line between a center of the deflection component and a center of the second blade and a connecting line between an edge of the housing and the center of the second blade define the second angle, and the second angle is from 1 degree to 250 degrees.

As a further improvement of the disclosure, the first mowing cavity and the second mowing cavity are respectively provided with two deflection components, the two deflection components are circumferentially arranged in the first mowing cavity or the second mowing cavity, connecting lines between centers of the two deflection components and a center of the first blade define a third angle, connecting lines between centers of the two deflection components and a center of the second blade define the third angle, and the third angle is from 20 degrees to 230 degrees.

As a further improvement of the disclosure, the lawn mower further includes a grass discharging passage, the grass discharging passage is arranged obliquely close to a guiding wall of the first blade, one end of the grass discharging passage is connected with the mowing space, the other end thereof is connected with a grass collection device, and a closing component is detachably connected between the grass discharging passage and the grass collection device to close or open the grass discharging passage.

As a further improvement of the disclosure, a sensing device is arranged in the grass discharging passage to detect whether the closing component is mounted in the grass discharging passage or not, when it is detected that the closing component is mounted in the grass discharging passage, the first blade and the second blade rotate at a same rotation speed, and when it is detected that the closing component is not mounted in the grass discharging passage, a rotation speed of the first blade is greater than a rotation speed of the second blade.

The beneficial effects of embodiments of the disclosure are: the embodiments provide a lawn mower, an arrangement of the first blade and the second blade in the housing enables the weeds to be mowed more evenly and finely by the first blade and the second blade, thereby preventing missed mowing. In some embodiments, an arrangement of deflection components in the first mowing cavity and the second mowing cavity can effectively improve mowing efficiency of the lawn mower, and the grass collection and grass shredding effects of the lawn mower can be improved to prevent leakage of mowing, which improves a beauty of the lawn. In some embodiments, a closing component is arranged between the first mowing cavity and the second mowing cavity, so that the lawn mower may be compatible with grass collection and grass shredding modes.

PART NUMBER DESCRIPTION

Figure 1:
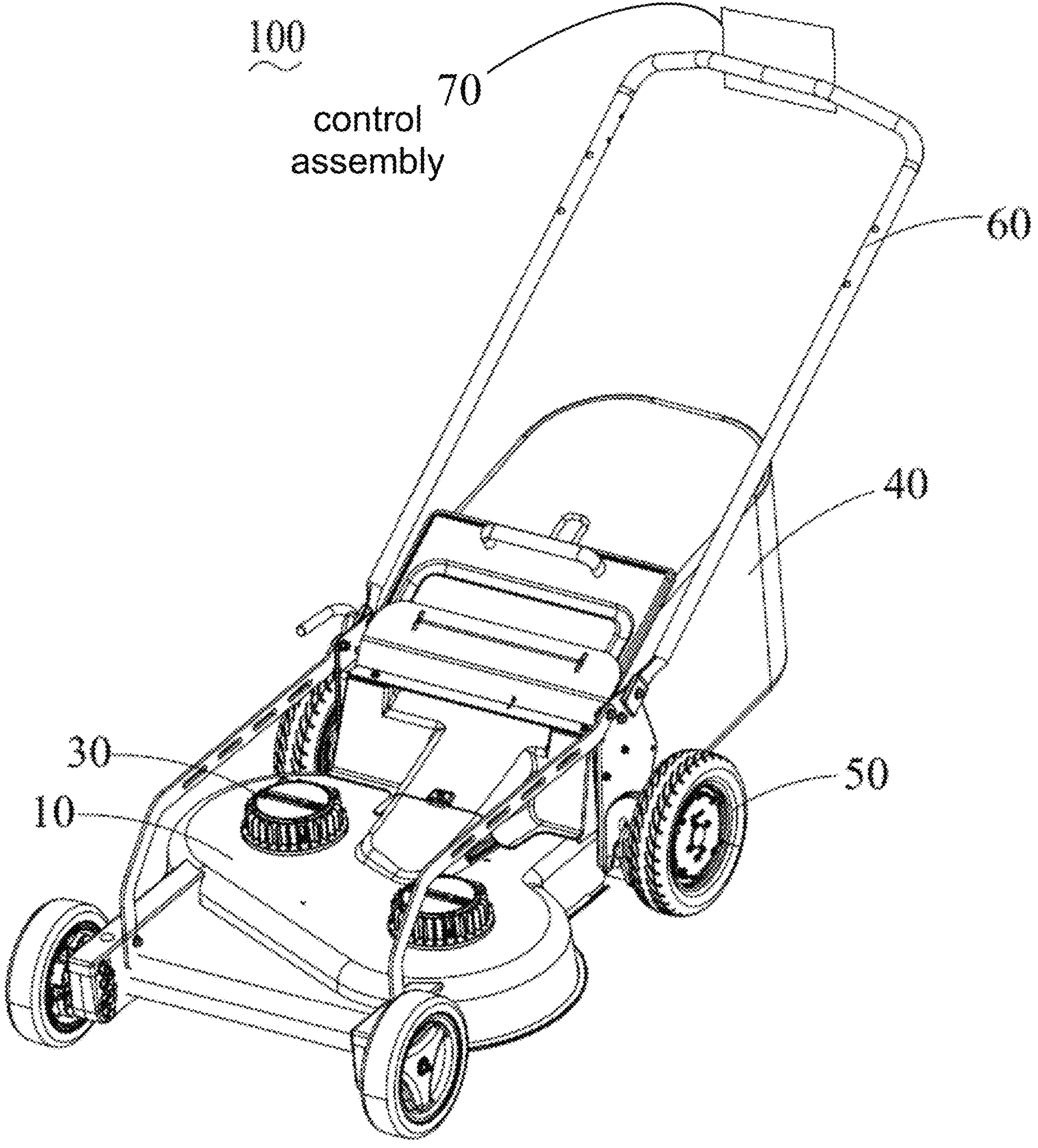
FIG. 1 is a perspective view of an embodiment of a lawn mower of the disclosure.

- 100—lawn mower, 10—housing, 11—mowing space, 12—top wall, 121—through hole, 13—peripheral wall, 131—side wall, 132—front wall, 133—step part, 14—opening, 15—mowing cavity, 151—first mowing cavity, 152—second mowing cavity, 153—communicating part, 161—first arc surface, 162—second arc surface, 17—grass discharging passage, 171—connecting end, 172—grass discharging opening, 173—guiding wall, 18—closing component, 19—deflection component, 191—top part, 192—first surface, 193—second surface, 1931—mounting part, 1932—mounting hole, 194—retaining rib,
- 20—cutter assembly, 21—first blade, 22—second blade, 23—rotation center, 24—assembling hole, 25—gasket, 26—fixing component, 27—overlapping part, 28—fixing base,
- 30—power assembly, 31—first motor, 32—second motor,
- 40—grass collection device,
- 50—traveling assembly, 51—front wheel, 52—rear wheel,
- 60—operating assembly.

DETAILED DESCRIPTION

In order to enable the objectives, technical solutions, and advantages of the disclosure to be clearer, the disclosure will be described in detail below with reference to the accompanying drawings and specific embodiments.

Here, it should be noted that, in order to avoid obscuring the disclosure due to unnecessary details, only the structure and/or processing steps closely related to the solution of the disclosure are shown in the drawings, and other details that have little to do with the disclosure are omitted.

In addition, it should be noted that the terms “include”, “comprise” or any other variants thereof are intended to cover non-exclusive inclusion, so that a process, method, article or equipment that includes a series of elements includes not only those elements, but also includes other elements that are not explicitly listed, or elements inherent to the process, method, article, or equipment.

Please refer to FIG. 1 through FIG. 8, the disclosure provides a lawn mower 100. The lawn mower 100 includes a housing 10, a cutter assembly 20, a power assembly 30, a power supply assembly (not shown), a grass collection device 40, a traveling assembly 50 and an operating assembly 60. The cutter assembly 20 is housed in the housing 10, and is driven in the housing 10. The power assembly 30 is at least partially housed in the housing 10 to supply power to the cutter assembly 20 to drive the cutter assembly 20. The power assembly 30 is connected with a control assembly 70 to output different rotation speeds and provides different cutting speeds for the lawn mower 100. The power supply assembly supplies power to the power assembly 30, which may be an alternative current power source or a direct current power source, such as a battery pack. The grass collection device 40 is connected with the mowing space 11 of the housing 10 through a passage to collect weeds mowed by the cutter assembly 20. The traveling assembly 50 is used to support the lawn mower 100 to rotate relative to ground, so that the operator may easily push the lawn mower 100. The operating assembly 60 includes a pushing rod extending upwards from a rear direction of the lawn mower 100. The pushing rod is further provided with a control assembly 70. The operator may control the lawn mower 100 through wired communication such as a control line or wireless communication such as Bluetooth, WIFI, and infrared.

Figure 2:
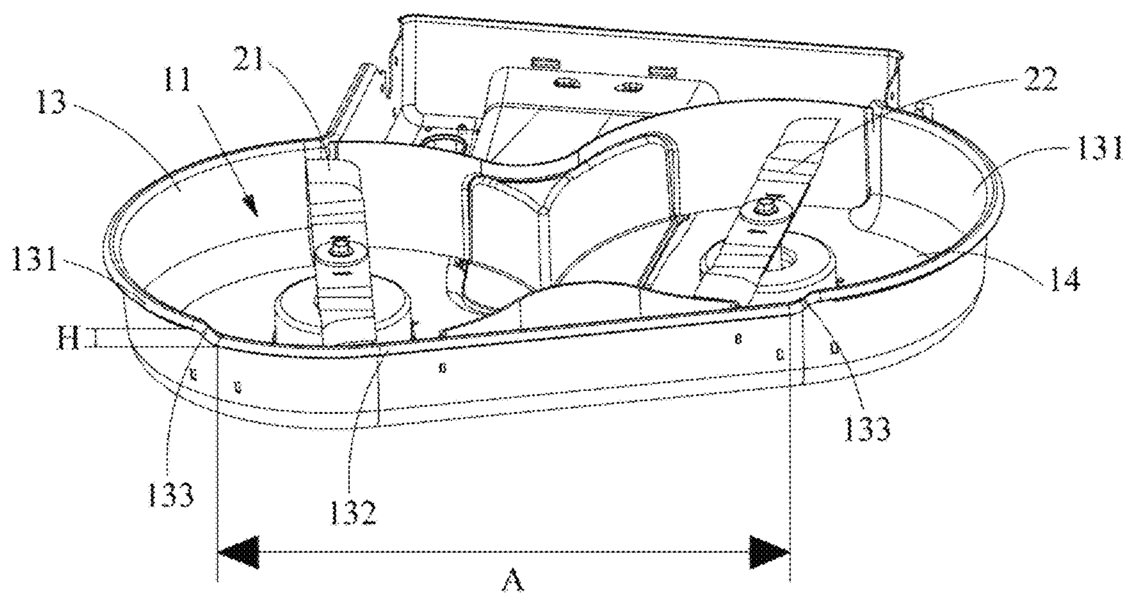
FIG. 2 is a perspective view of a structure of a housing in FIG. 1.
Figure 3:
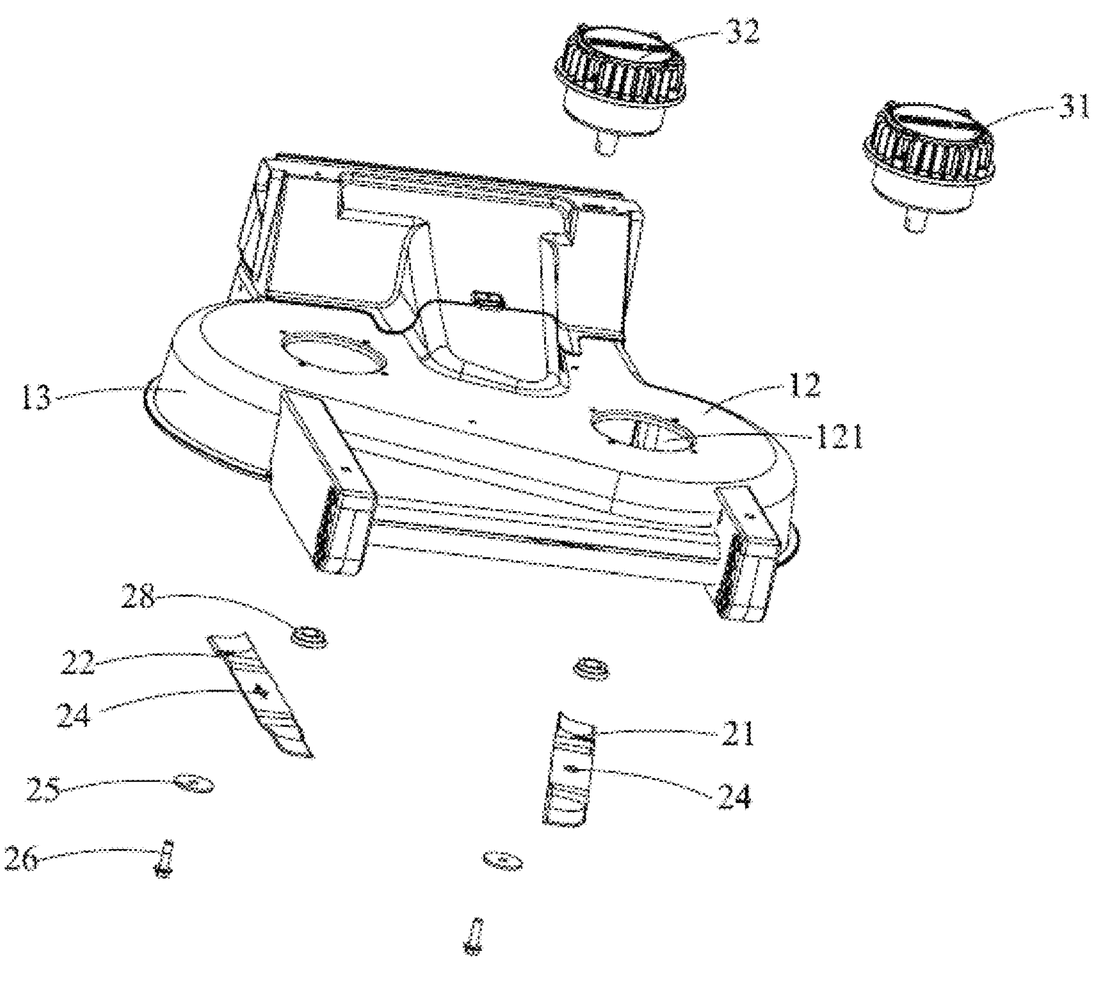
FIG. 3 is a disassembled view of the structure of the housing of FIG. 2.

Please refer to FIG. 2 and FIG. 3. The housing 10 includes a top wall 12 and a peripheral wall 13 extending downward from an edge of the top wall 12. The top wall 12 and the peripheral wall 13 define a mowing space 11 for housing the cutter assembly 20, and a bottom of the mowing space 11 is provided with an opening 14. Further, a through hole 121 is arranged on the top wall 12 for partially housing the power assembly 30. The power assembly 30 passes through the through hole 121 and is connected with the cutter assembly 20 in the mowing space 11. When the lawn mower 100 is in a grass shredding mode, the weeds are mowed by the cutter assembly 20 in the housing 10 for many times, then discharged from the opening 14 to the ground, and spread evenly on the ground, thereby being absorbed by land as fertilizer.

Further, the peripheral wall 13 includes a side wall 131 and a front wall 132, a step part 133 is arranged between the side wall 131 and the front wall 132, and the step part 133 is gradually lowered from the side wall 131 to the front wall 132. In some embodiments, the peripheral wall 13 includes two side walls 131. The two side walls 131 are symmetrically arranged. The front wall 132 is located between the two side walls 131, and a step part 133 is arranged between the front wall 132 and each side wall 131, which means that there are two step parts 133, and both of the two step parts 133 are gradually lowered from the side wall 131 to the front wall 132. In some embodiments, a width A of the front wall 132 is from 200 to 700 mm. This arrangement may effectively solve a problem of missed mowing caused by not entering the mowing space 11 because of overwhelming the weeds by the housing 10.

Further, a distance of the front wall 132 to the ground is greater than a distance of the side wall 131 to the ground. In some embodiments, a height H of the step part 133 in a vertical direction is from 5 mm to 30 mm, which means that a height difference between the front wall 132 and the side wall 131 in the vertical direction is from 5 mm to 30 mm. With this arrangement, the weeds may smoothly enter the mowing space 11.

Figure 4:
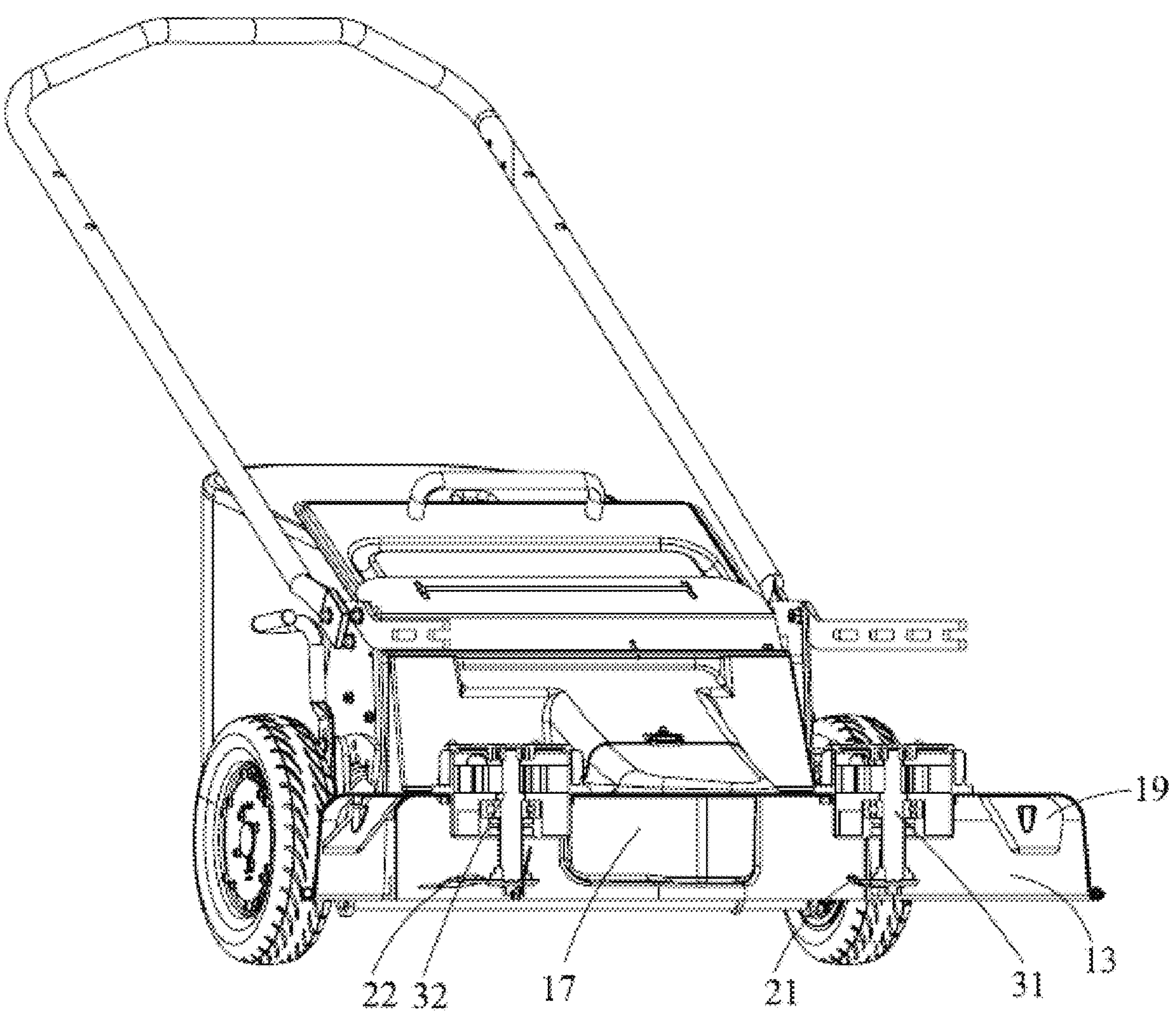
FIG. 4 is a cross-sectional view of FIG. 1.

Please refer to FIG. 4 combined with FIG. 2, a distance of the housing 10 to the ground is less than a distance of the cutter assembly 20 to the ground. In other words, a distance of the peripheral wall 13 of the housing 10 to the ground is the smallest, thereby protecting the operator and avoiding that the operator's or other people's feet extend into the mowing space 11 during a working process of the lawn mower 100, which causes personal injury.

In some embodiments, due to an existence of the step part 133, the distance of the front wall 132 to the ground is greater than the distance of the side wall 131 to the ground, which means that a lowest point of the peripheral wall 13 is located on the two side walls 131, and a distance of the lowest point on the side walls 131 to the ground is less than 1 cm. In a direction of the height of the stepping mower, a height difference of the first blade or the second blade and a lowest point of the deflection component is greater than 5 mm. By setting the cutter assembly 20 within the range mentioned above, the lawn mower 100 may achieve a best grass collection and grass shredding effect during mowing.

Figure 5:
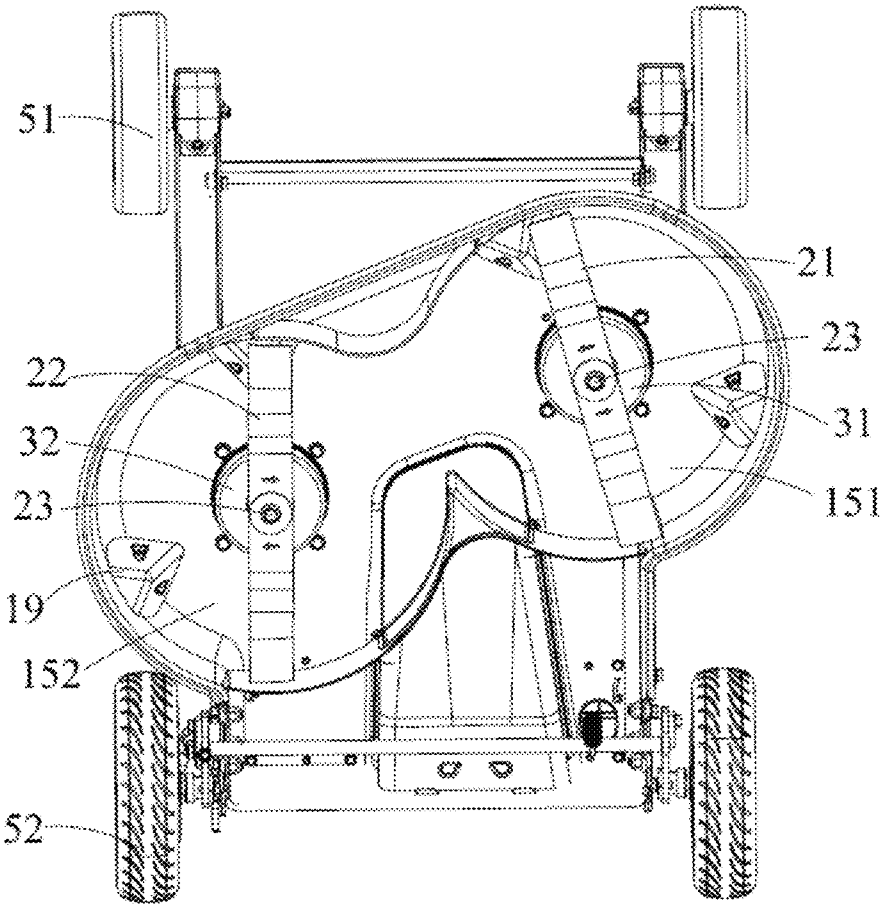
FIG. 5 is a perspective view of another part of FIG. 1.

Please refer to FIG. 5 combined with FIG. 1, the traveling assembly 50 includes a pair of front wheels 51 and a pair of rear wheels 52. A horizontal distance between the pair of rear wheels 52 is greater than a horizontal distance between the pair of front wheels 51. In addition, a width of the housing 10 in a left-right direction of the lawn mower 100 is greater than a width of the pair of rear wheels 52. In other words, a width of the mowing space of the lawn mower 100 is the largest, which means that both sides of the housing 10 protrude from a pair of front wheels 51 or a pair of rear wheels 52, so that when the lawn mower 100 is mowing on the grass, the front wheels 51 or the rear wheels 52 are prevented from blocking the lawn mower 100 from approaching the mowing boundary, which caused missed mowing. The grass in this disclosure may be lawn, fence, garden, etc.

Please refer to FIG. 2 through FIG. 5. The cutter assembly 20 is housed in the mowing space 11 in the housing 10. The cutter assembly 20 is driven by the power assembly 30 to rotate. In some embodiments, the cutter assembly 20 is a blade 20. The blade 20 is rotatably accommodated in the mowing space 11 and rotates around its rotation axis. The blade 20 is driven by the power assembly 30. A mowing cavity 15 is defined in the mowing space 11, and the blade 20 rotates in the mowing cavity 15. The number of blades 20 is the same as the number of mowing cavities 15. Further, there is a gap between a tip of the blade 20 and an inner wall of the mowing cavity 15. In some embodiments, the gap between the tip of the blade 20 and the inner wall of the mowing cavity 15 is greater than 5 mm and less than or equal to 15 mm.

Please refer to FIG. 5 combined with FIG. 3. In an embodiment of the disclosure, the lawn mower 100 is provided with two blades 20. The blades 20 includes a first blade 21 and a second blade 22. The first blade 21 and the second blade 22 are horizontally arranged on a same plane, so that a height of the mowing is consistent. By arranging the first blade 21 and the second blade 22, a mowing range of the lawn mower 100 may be effectively increased, which improves mowing efficiency. In this embodiment, a size and shape of the first blade 21 and the second blade 22 are the same. In other embodiments, the size and shape of the first blade 21 and the second blade 22 may also be different, which is not limited here.

Further, the power assembly 30 includes a first motor 31 and a second motor 32. Output shafts of the first motor 31 and the second motor 32 pass through the through holes 121 on the housing 10 and are respectively connected with the first blade 21 and the second blade 22. Centers of the first blade 21 and the second blade 22 is provided with assembling holes 24. A gasket 25 and a fixing component 26 are arranged under the first blade 21 or the second blade 22. The fixing component 26 passes through the gasket 25 and the assembling hole 24 of the first blade 21 or the second blade 22 and is tightly connected with the output shafts of the first motor 31 or the second motor 32 respectively. In some embodiments, a fixing base 28 is further arranged between the first motor 31 and the first blade 21, or between the second motor 32 and the second blade 22. The first blade 21 and the second blade 22 are directly driven by the first motor 31 and the second motor 32, so that the double-blade lawn mower 100 of the disclosure is more efficient than a lawn mower that uses a belt or gear to drive the blade 20 to rotate, the durable life of the double-blade lawn mower 100 is longer and maintenance cost of the double-blade lawn mower 100 is decreased.

Further, the first motor 31 drives the first blade 21 to rotate, and the second motor 32 drives the second blade 22 to rotate. The first motor 31 and the second motor 32 rotate in opposite directions, and rotation directions of the first blade 21 and the second blade 22 are opposite. When viewed from a bottom of the housing 10, the first blade 21 rotates counterclockwise, and the second blade 22 rotates clockwise. With this arrangement, grass flow mowed by the first blade 21 and the second blade 22 is discharged backward from a middle of the two blades 20, and enters the grass collection device 40 through the grass discharging passage 17.

Further, a distance between motor shafts of the first motor 31 and the second motor 32 is greater than a sum of radii of the first blade 21 and the second blade 22. With this arrangement, a gap may be arranged between the first blade 21 and the second blade 22, and it is ensured that the two blades 20 will not collide during operation.

Figure 6:
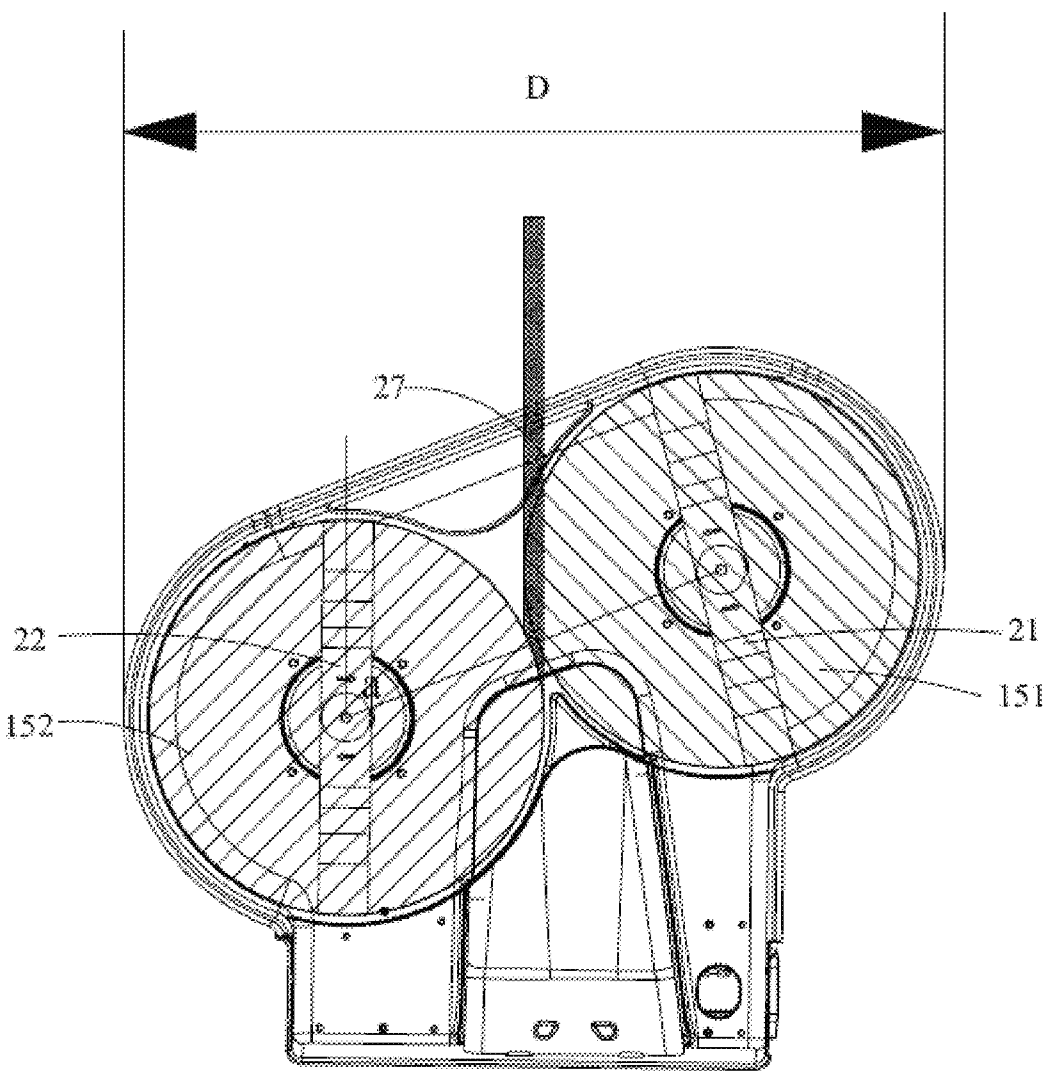
FIG. 6 is a schematic view of a structure of an overlapping part in FIG. 1.
Figure 7:
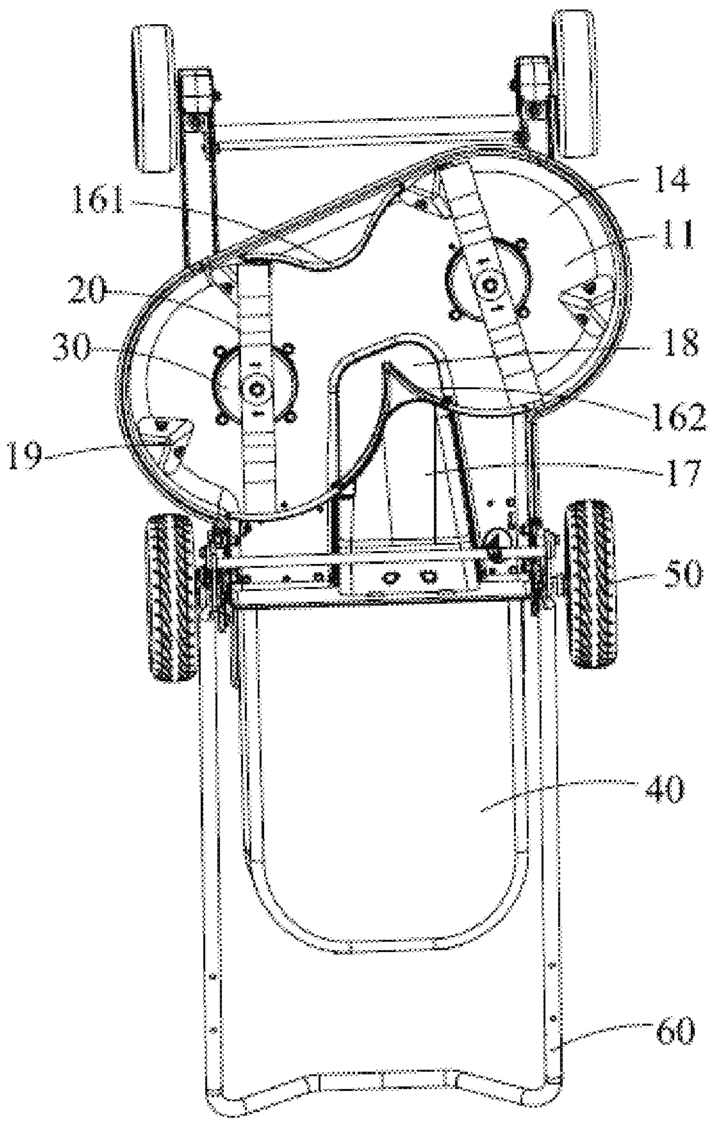
FIG. 7 is another perspective view of FIG. 1 (grass collection mode).

Please refer to FIG. 6, the first blade 21 and the second blade 22 rotate around their respective rotation axes to define respective rotation centers 23, and a connection line between the two rotation centers 23 of the first blade 21 and the second blade 22 defines a first angle a with a front and rear direction of the lawn mower 100. The first angle a is from 30 degrees to 90 degrees. In some embodiments, the first angle is 68 degrees. This arrangement may not only avoid a phenomenon of mowing leakage during mowing, but also ensure a mowing area and improve the efficiency of mowing.

Please refer to FIG. 6 combined with FIG. 5. A width of the mowing space 11 in the left-right direction of the lawn mower 100 is greater than a width of the first mowing cavity 151 or the second mowing cavity 152, and is smaller than a sum of the widths of the first mowing cavity 151 and the second mowing cavity 152. The first blade 21 is driven by the first motor 31 to define a first mowing area in the first mowing cavity 151, and the second blade 22 is driven by the second motor 32 to define a second mowing area in the second mowing cavity 152. Overlapping of cutting areas of the first blade 21 and the second blade 22 in the front and rear direction of the lawn mower 100 defines an overlapping part 27, which means that the first mowing area and the second mowing area in the front and rear direction of the lawn mower 100 has the overlapping part 27. A ratio of a width of the overlapping part 27 to the width D of the mowing space 11 is from 0.01 to 0.09. With this arrangement, it may be ensured that there is no blank area for mowing between the first blade 21 and the second blade 22, and the missed mowing between the first blade 21 and the second blade 22 is prevented, which improves the mowing effect of the lawn mower 100.

Further, the width of the overlapping part 27 is greater than or equal to 10 mm and less than or equal to 35 mm. By arranging the overlapping part 27, the missed mowing of the lawn mower 100 may be prevented, and the beauty of the lawn after mowing may be improved.

In other ways known to the inventor, in order to ensure a mowing ability of the lawn mower 100, a high-rotation-speed motor 30 is generally used to drive the blade 20 to rotate at a high rotation speed, thereby improving the mowing efficiency of the lawn mower 100. However, the mowing efficiency does not gradually increase with the rotation speed of the blade 20. Since the mowing cavity 15 in the lawn mower 100 is a limited space, an airflow space in the mowing cavity 15 is small. The blade 20 is driven by the high-speed motor 30 to rotate at a high rotation speed, thereby driving the airflow to flow. The flowing airflow defines a strong high-pressure zone in the mowing cavity 15, so that part of the shredded grass mowed by the blade 20 stays in the high-pressure zone, and is attached to the inner wall of the mowing cavity 15 under an action of air pressure, which is not easy to fall and causes a phenomenon of broken grass sticking to the housing. As a result, the mowing operation cannot be performed, the mowing effect of the lawn mower 100 is reduced, and the lawn mower 100 may even be damaged. However, if the rotation speed of the blade 20 is too low, the blade 20 will not sufficiently mow the grass, which will also reduce the mowing efficiency.

In one embodiment of the disclosure, the lawn mower 100 adopts a specific rotation speed of the motor 30 and a rotation linear velocity of the blade 20. A combination of the specific rotation speed of the motor 30 and the rotation linear velocity of the blade 20 can not only enable the lawn mower 100 to have a better housing-free effect, but also ensure that the lawn mower 100 has a better grass collection and grass shredding effect.

In some embodiments, the first motor 31 drives the first blade 21 to rotate counterclockwise, and the second motor 32 drives the second blade 22 to rotate clockwise. The rotation speeds of the first motor 31 and the second motor 32 are set to 3200 r/min~3600 r/min respectively, and the linear velocity of the first blade 21 and the second blade 22 are set to be 65 m/s~80 m/s respectively. With this arrangement, the lawn mower 100 has a better grass collection and grass shredding effect, and the grass collection efficiency reaches more than 95%, which brings a better grass mowing experience to the operator.

Further, the lawn mower 100 may optionally is provided with a self-propelled function. In an embodiment of the disclosure, the lawn mower 100 is provided with a self-propelled hub motor (not shown), which is mounted in the traveling assembly 50, and the traveling assembly 50 with the hub motor may drive the lawn mower to move back and forth. The hub motor is completely mounted in the traveling assembly 50. When rotation speeds of the traveling assembly 50 on left and right sides are the same, the lawn mower 100 moves straight forward. When the rotation speeds of the traveling assembly 50 on the left and right sides are different, the lawn mower 100 turns. When the rotation speed of the traveling assembly 50 on the left side is higher, the lawn mower 100 turns to the right side. When the rotation speed of the traveling assembly 50 on the right side is higher, the lawn mower 100 turns to the left side. When the traveling assembly 50 on the left and right sides turn in opposite directions, the lawn mower 100 turns in place.

Further, the rotation speed of the blade 20 at least partially matches a rotation speed of the hub motor. When a moving speed of the lawn mower 100 gets faster, which means that when the rotation speed of the hub motor is high, the rotation speed of the blade 20 should also be increased to avoid uneven mowing. When the moving speed of the lawn mower 100 slows down, the rotation speed of the blade 20 should also be reduced to save energy. It should be pointed out that the rotation speed of the blade 20 is adjusted within a certain range, in some embodiments, between 3200 r/min and 3600 r/min.

It should be noted that in other embodiments, the traveling assembly 50 may not be driven by a hub motor, but by a driving motor 30 mounted on the lawn mower 100. At this time, an adjustment of the rotation speed of the blade 20 is based on the moving speed of the lawn mower 100. The rotation speed of the blade 20 is adjusted according to the moving speed.

Please refer to FIG. 2 through FIG. 8. The first blade 21 and the second blade 22 are driven by the first motor 31 and the second motor 32 to rotate in the mowing space 11 of the housing 10 and define a rotation plane. The first mowing cavity 151 and the second mowing cavity 152 are defined in the mowing space 11. The first blade 21 rotates in the first mowing cavity 151, and the second blade 22 rotates in the second mowing cavity 152. The first mowing cavity 151 and the second mowing cavity 152 are communicated with each other. The first mowing cavity 151 and the second mowing cavity 152 are alternately staggered and arranged back and forth along a forward direction of the lawn mower 100, which means that the first mowing cavity 151 is located at a left front of the second mowing cavity 152, so that the first blade 21 and the second blade 22 may cross-mow. By arranging the first mowing cavity 151 and the second mowing cavity 152 staggeredly, a layout space of the mowing space 11 may be saved, a compactness of an overall structure of the lawn mower 100 is improved, and all the grass entering the mowing range may be mowed to prevent missed mowing.

In some embodiments, the housing 10 of the lawn mower 100 further includes a first arc surface 161 and a second arc surface 162. The first arc surface 161 and the second arc surface 162 define an 8-shaped mowing space 11 with the two mowing cavities 15 together. After the weeds enter the mowing cavity 15, they cannot easily fly out, and multiple mowings may be realized under an action of a rotation of the first blade 21 and the second blade 22, so that the weeds can be mowed more evenly. As a result, the grass discharged from the opening 14 on a bottom surface of the housing 10 is more uniform, and the shredded grass is more easily absorbed by the ground.

In some embodiments, there is a communicating part 153 between the first mowing cavity 151 and the second mowing cavity 152. The communicating part 153 may enable the weeds in the first mowing cavity 151 and the second mowing cavity 152 to flow in the first mowing cavity 151 and the second mowing cavity 152, thereby being mowed again by the first blade 21 and the second blade 22, so that the grass is mowed more finely, and is easier to be absorbed by the land or collected by the grass collection device 40.

In some embodiments, the lawn mower 100 further includes a grass discharging passage 17. The grass discharging passage 17 is arranged in a middle of the first mowing cavity 151 and the second mowing cavity 152 and extends backward and obliquely upward, so that the mowed grass may be discharged from a rear side of the grass discharging passage 17 outwardly.

One end of the grass discharging passage 17 is connected with the mowing space 11, and the other end of the grass discharging passage 17 is connected with a grass collection device 40. The grass discharging passage 17 includes a connecting end 171 facing the mowing space 11 and a grass discharging opening 172 facing away from the connecting end 171. The grass collection device 40 is connected with the mowing space 11 through the grass discharging opening 172 of the grass discharging passage 17, and is configured to collect shredded grass in the grass collection mode.

In some embodiments, a height of the grass discharging opening 172 is higher than a height of the connecting end 171, so as to increase an inclination angle of the grass discharging passage 17 to reach a grass discharging height of the lawn mower 100. In some embodiments, the height of the connecting end 171 is higher than heights of the first blade 21 and the second blade 22 in the housing 10. With this arrangement, the grass mowed by the first blade 21 and the second blade 22 may more fully enter the grass discharging passage 17, thereby improving the grass collection effect.

Figure 8:
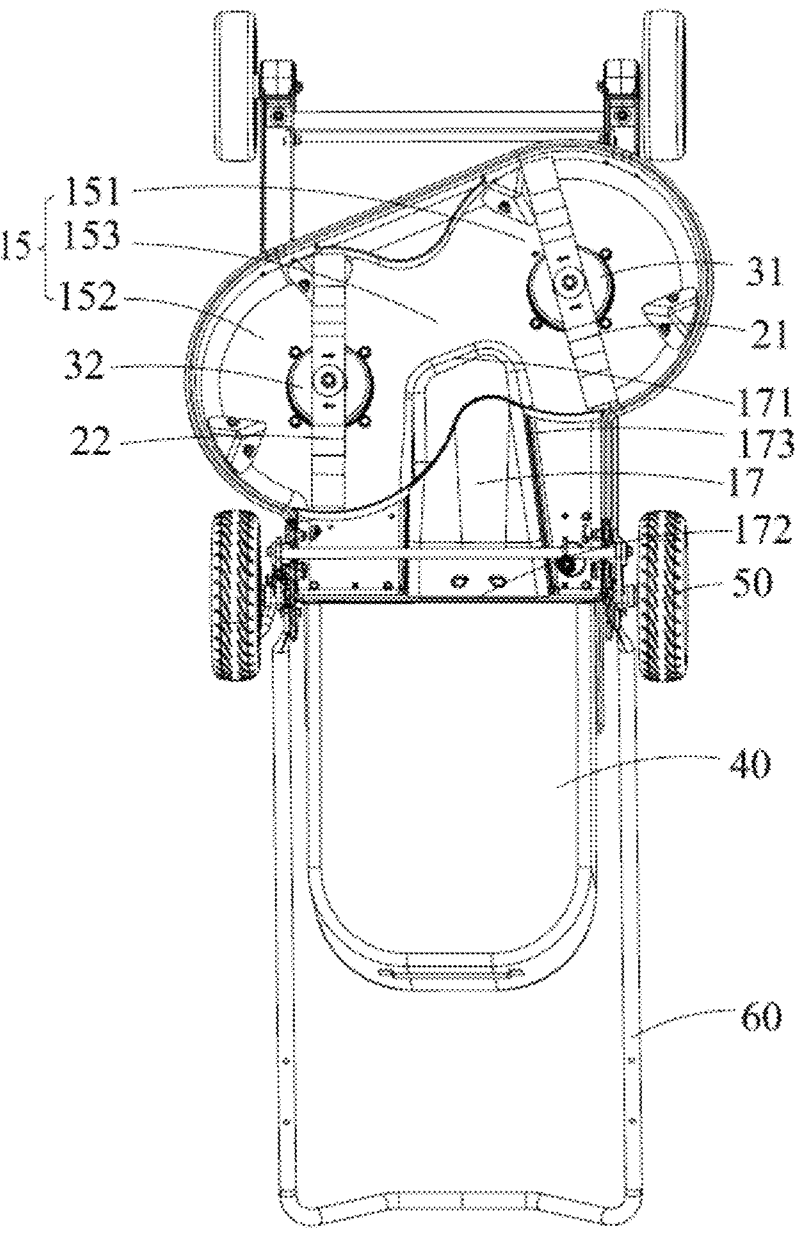
FIG. 8 is yet another perspective view of FIG. 1 (grass shredding mode).
Figure 9:
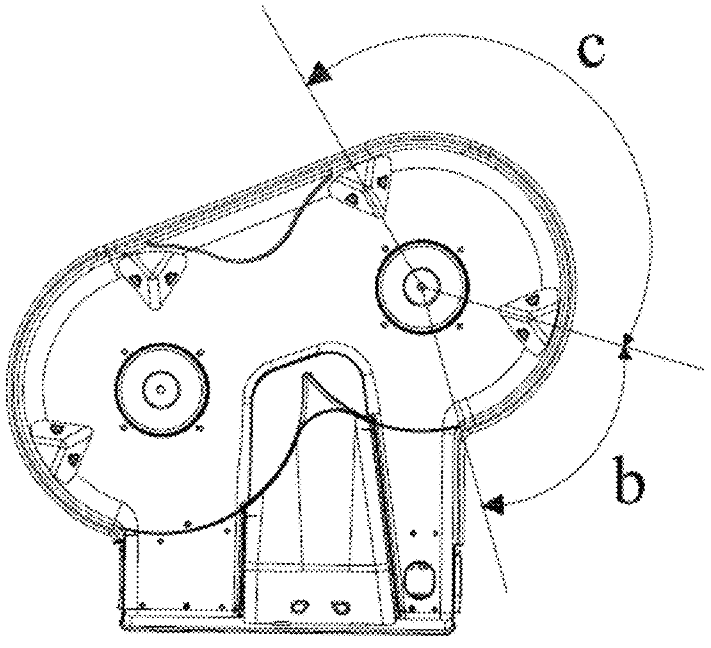
FIG. 9 is a distribution view of deflection components in FIG. 5.

Please refer to FIG. 8 through FIG. 9 combined with FIG. 2 through FIG. 7. The connecting end 171 is connected with the connecting part 153, and a closing component 18 is detachably connected with the connecting end 171 for closing or opening the grass discharging passage 17. Through the closing component 18, the lawn mower 100 may be compatible with both the grass collection mode and the grass shredding mode.

When the closing component 18 is mounted at the connecting end 171 of the grass discharging passage 17, the grass discharging passage 17 and the mowing space 11 are closed by the closing component 18, and the lawn mower 100 enters the grass shredding mode. Further, the second arc surface 162 is arranged on the closing component 18. The second arc surface 162, the first arc surface 161, the first mowing cavity 151 and the second mowing cavity 152 define a closed inclined 8-shaped structure, so that weeds are fully mowed by the first blade 21 in the first mowing cavity 151 and by the second blade 22 in the second mowing cavity 15. At this time, the shredded grass cannot enter the grass collection device 40 through the grass discharging passage 17, but is discharged from the opening 14 of the bottom of the housing 10, spread on the ground, turned into fertilizer and absorbed by the land. When the closing component 18 is taken out, the grass discharging passage 17 is opened at this time, and the lawn mower 100 is in the grass collection mode. At this time, the shredded grass may enter the grass discharging passage 17 through the communicating part 153 of the first mowing cavity 151 and the second mowing cavity 152, enter the grass collection device 40 from the grass discharging opening 172 of the grass discharging passage 17 and be collected in the grass collection device 40.

In an embodiment of the disclosure, the first blade 21 is closer to a front end of the lawn mower 100 than the second blade 22. A size of the first blade 21 is the same as a size of the second blade 22, and a rotation speed of the first blade 21 is greater than a rotation speed of the second blade 22. With this arrangement, an airflow rate caused by the first blade 21 is higher than an air flow rate caused by the second blade 22. Since the rotation speeds of the first blade 21 and the second blade 22 are opposite, the first blade 21 rotates counterclockwise, and the second blade 22 rotates clockwise, so that airflow caused by the first blade 21 and the second blade 22 merge to flow directly behind the mowing space 11, which means to a position of the grass discharging passage 17, thereby allowing the mowed grass to flow into the grass collection device 40 through the grass discharging passage 17.

In one embodiment of the disclosure, a sensing device (not shown) is arranged in the grass discharging passage 17, which may detect whether the closing component 18 is mounted in the grass discharging passage 17. When the sensing device detects that the closing component 18 is mounted in the grass discharging passage 17, the control assembly 70 controls the first blade 21 and the second blade 22 to rotate at the same rotation speed. When the sensing device detects that the closing component 18 is not mounted in the grass discharging passage 17, the control assembly 70 controls the rotation speed of the first blade 21 to be greater than the rotation speed of the second blade 22. In some embodiments, the rotation speed of the first blade 21 is greater than the rotation speed of the second blade 22 by 5% to 40%.

In another embodiment of the disclosure, a guiding wall 173 of the grass discharging passage 17 is arranged obliquely. In some embodiments, the first blade 21 is closer to the front end of the lawn mower 100 than the second blade 22, the size of the first blade 21 is the same as the size of the second blade 22, and the grass discharging passage 17 is arranged obliquely close to the guiding wall 173 of the first blade 21, which means that the guiding wall 173 is located on one side of the first blade 21. Since the first blade 21 is arranged forward relative to the second blade 22 and a tangent line of the first mowing cavity 151 and the second mowing cavity 152 is inclined, grass flow is discharged backward along a direction of the tangent line. The guiding wall 173 of the grass discharging passage 17 close to the first blade 21 is arranged in an oblique arrangement, so that the grass flow may directly enter the grass collection device 40 and prevent the grass from accumulating in the grass discharging passage 17.

In other embodiments of the disclosure, since the first blade 21 is closer to the front end of the lawn mower 100 than the second blade 22, the size of the first blade 21 may be set to be larger than the size of the second blade 22. In this way, even if the rotation speeds of the first blade 21 and the second blade 22 are the same, the airflow generated by the first blade 21 is still greater than the airflow generated by the second blade 22, so that the airflow merged by the airflow of the first blade 21 and the airflow of the second blade 22 may flow directly to rear, which means that the merged airflow flows to the position of the grass discharging passage 17, thereby allowing the mowed grass to flow directly into the grass collection device 40 through the grass discharging passage 17.

Figure 10:
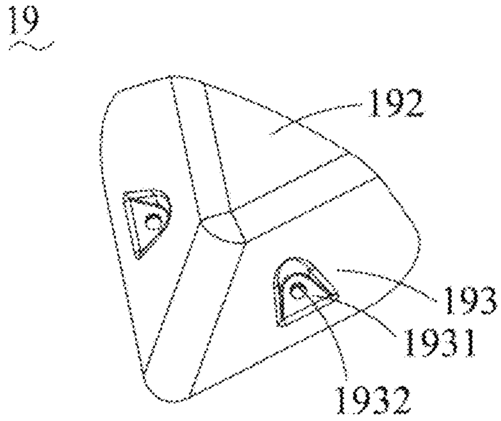
FIG. 10 is a perspective view of the deflection component in FIG. 9.
Figure 11:
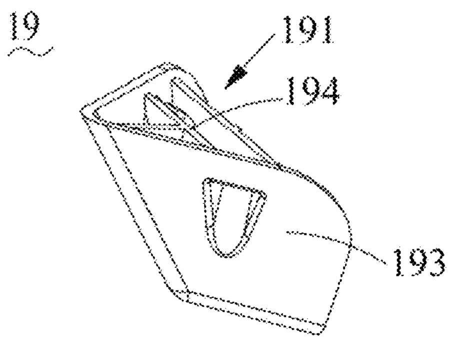
FIG. 11 is another perspective view of FIG. 10.

Please refer to FIG. 9 through FIG. 11 combined with FIG. 5. The first mowing cavity 151 and the second mowing cavity 152 are provided with a deflection component 19. Each mowing cavity 15 is provided with at least one deflection component 19, and the at least one deflection component 19 is circumferentially arranged in the mowing cavity 15. Through setting the deflection component 19, a movement path of the weeds in the mowing cavity 15 may be changed, and the airflow in the mowing cavity 15 may be affected, so that when the airflow passes through the deflection component 19, the airflow can hit the deflection component 19 to define a whirling airflow, which enables the weeds not to fall easily and to be mowed by the blade 20 in the mowing cavity 15 for multiple times, thereby effectively improving the grass collection and grass shredding effect.

In some embodiments, in a direction of the height of the lawn mower, a lowest point of the deflection component is located above a rotation plane of the first blade or the second blade, which means that the deflection component 19 is arranged on the top wall 12 of the housing 10 and is located above the rotation plane of the first blade 21 or the second blade 22, thereby preventing the deflection component 19 from affecting rotation paths of the first blade 21 and the second blade 22.

In some embodiments, a top part 191 of each deflection component 19 is connected with the top wall 12 and extends downward and inward from the top part 191 to define a triangular first surface 192. In some embodiments, the top part 191 of the deflection component 19 is triangular and hollow, and a plurality of retaining ribs 194 are arranged inside the deflection component 19 to improve a structural strength of the deflection component 19. A line connecting a center of the top part 191 and a center of the first surface 192 is perpendicular to the top wall 12 of the housing 10. Further, an inclined second surface 193 is defined between the top part 191 and the first surface 192. The second surface 193 is provided with a mounting part 1931, and the fixing component 26 passes through a mounting hole 1932 on the mounting part 1931 to fix the deflection component 19 on the top wall 12. With this arrangement, the weeds may be deflected downwards and inwards in the mowing cavity 15, so that the blade 20 may mowed the weeds multiple times, which effectively improves the grass mowing and grass collection effect of the lawn mower 100.

In some embodiments, a connecting line between a center of the deflection component 19 and a rotation center of the first blade 21 and a connecting line between an edge of the housing 10 and the rotation center of the first blade 21 define a second angle b, or a connecting line between a center of the deflection component 19 and a rotation center of the second blade 22 and a connecting line between an edge of the housing 10 and the rotation center of the second blade 22 define the second angle b, and the second angle b is from 1 degree to 250 degrees. The center of the deflection component 19 is substantially a center point of the geometry of the deflection component 19. Through setting a position of the deflection component 19, the deflection component 19 may influence the airflow in the mowing cavity 15 to a greater extent, so that the weeds can be mowed by the blade 20 multiple times in the mowing cavity 15, thereby effectively improving the grass collection and grass shredding effect of the lawn mower 100.

In an embodiment of the disclosure, the first mowing cavity 151 and the second mowing cavity 152 are respectively provided with two deflection components 19. The two deflection components 19 are circumferentially arranged in the first mowing cavity 151 and the second mowing cavity 152 respectively. Connecting lines between centers of the deflection components 19 and a center of the first blade 21 define a third angle c, or connecting lines between centers of the deflection components 19 and a center of the second blade 22 define the third angle c, and the third angle c is from 20 degrees to 230 degrees. The center of the deflection component 19 is substantially a center point of the geometry of the deflection component 19. Through setting the position of the deflection component 19 in the mowing cavity 15, the number of times that the blade 20 mows the weeds may be effectively increased, thereby effectively improving the grass collection and grass shredding effects of the lawn mower 100. In summary, the lawn mower 100 of some embodiments can effectively reduce collisions between the two mowing cavities 15 where front parts intersect through arranging the step part 133, which solves a problem of missing mowing at a junction of the two mowing cavities 15, enables a height of the mowed lawn to be smooth and beautiful, and improve the grass collection and grass shredding effect of the lawn mower 100.

The above embodiments are only used to illustrate the technical solutions of the disclosure and not to limit them. Although the disclosure has been described in detail with reference to preferred embodiments, those of ordinary skill in the art should understand that the technical solutions of the disclosure may be modified or equivalently replaced without departing from the spirit and scope of the technical solutions of the disclosure.

What is claimed is:

1. A lawn mower, comprising:

a cutter assembly, comprising a first blade and a second blade, the first blade and the second blade being staggered and arranged back and forth, a grass discharging passage, arranged obliquely close to a guiding wall of the first blade;

a power assembly, supplying power to the cutter assembly and comprising a first motor and a second motor, the first motor and the second motor respectively connected with the first blade and the second blade, and a housing, comprising a mowing space configured to house the cutter assembly, the mowing space comprising a first mowing cavity and a second mowing cavity, the first blade is located in the first mowing cavity and the second blade is located in the second mowing cavity, and the first mowing cavity and the second mowing cavity configured to communicate with each other, wherein a width of the mowing space is greater than a width of the first mowing cavity or a width of the second mowing cavity, and is smaller than a sum of the widths of the first mowing cavity and the second mowing cavity, an overlapping part is provided by overlapping of cutting areas of the first blade and the second blade in a front and rear direction of the lawn mower, and a ratio of a width of the overlapping part to the width of the mowing space is from 1% to 9%;

a first end of the grass discharging passage is connected with the mowing space, a second end of the grass discharging passage is connected with a grass collection device, and a closing component is detachably connected between the grass discharging passage and the grass collection device to close or open the grass discharging passage;

the first blade is driven by the first motor and the second blade is driven by the second motor, the power assembly is electrically connected with a control assembly, the control assembly is arranged on a pushing rod of the lawn mower and configured to control a rotation speed of the first motor and a rotation speed of the second motor independently, allowing the first blade and the second blade to rotate at a same or different speeds, and a sensing device is arranged in the grass discharging passage to detect whether the closing component is mounted in the grass discharging passage or not, when it is detected that the closing component is mounted in the grass discharging passage, the first blade and the second blade rotate at a same rotation speed, and when it is detected that the closing component is not mounted in the grass discharging passage, the rotation speed of the first blade is greater than the rotation speed of the second blade.

2. The lawn mower according to claim 1, wherein a connecting line of rotation centers of the first blade and the second blade defines a first angle with the moving direction of the lawn mower, and the first angle is from 30 degrees to 90 degrees.

3. The lawn mower according to claim 1, wherein the width of the overlapping part is greater than or equal to 10 mm and less than or equal to 35 mm.

4. The lawn mower according to claim 1, wherein the housing comprises a top wall and a peripheral wall extending downward from an edge of the top wall, the top wall and the peripheral wall define the mowing space to house the cutter assembly, the power assembly partially passes through the housing and is connected with the cutter assembly, the peripheral wall comprises a side wall and a front wall, a step part is arranged between the side wall and the front wall.

5. The lawn mower according to claim 4, wherein the peripheral wall comprises two side walls, the two side walls are symmetrically arranged, the front wall is located between the two side walls, and the step part is arranged between the front wall and each of the side walls.

6. The lawn mower according to claim 4, wherein a distance of the front wall to ground is greater than a distance of the side wall to the ground.

7. The lawn mower according to claim 4, wherein a height of the step part in a vertical direction is from 5 mm to 30 mm.

8. The lawn mower according to claim 4, wherein a width of the front wall is from 200 mm to 700 mm.

9. The lawn mower according to claim 4, wherein a distance of a lowest point on the side wall to the ground is less than 1 cm.

10. The lawn mower according to claim 4, wherein in a direction of a height of the lawn mower, a height difference of the first blade or the second blade and a lowest point of a deflection component is greater than 5 mm.

11. The lawn mower according to claim 1, wherein a distance between motor shafts of the first motor and the second motor is greater than a sum of radii of the first blade and the second blade.

12. The lawn mower according to claim 1, wherein the rotation speeds of the first motor and the second motor are from 3200 r/min to 3600 r/min, and linear velocities at ends of the first blade and the second blade are from 65 m/s to 80 m/s.

13. The lawn mower according to claim 1, wherein gaps are arranged between a tip of the first blade and an inner wall of the first mowing cavity, and between a tip of the second blade and an inner wall of the second mowing cavity, and the gaps are greater than 5 mm and less than 15 mm.

14. The lawn mower according to claim 1, wherein the first blade is closer to the front of the lawn mower than the second blade, rotation directions of the first blade and the second blade are opposite, and a size of the first blade is larger than a size of the second blade.

15. The lawn mower according to claim 1, wherein deflection components are arranged in the first mowing cavity and the second mowing cavity, the deflection component is connected with the top wall and extends downwardly and inwardly from the top wall.

16. The lawn mower according to claim 15, wherein in a direction of the height of the lawn mower, a lowest point of the deflection component is located above a rotation plane of the first blade or the second blade.

17. The lawn mower according to claim 16, wherein a connecting line between a center of the deflection component and a center of the first blade and a connecting line between an edge of the housing and the center of the first blade, or a connecting line between a center of the deflection component and a center of the second blade and a connecting line between an edge of the housing and the center of the second blade, define a second angle, and the second angle is from 1 degree to 250 degrees.

18. The lawn mower according to claim 16, wherein the first mowing cavity and the second mowing cavity are respectively provided with two deflection components, the two deflection components are circumferentially arranged in the first mowing cavity or the second mowing cavity; connecting lines between centers of the two deflection components and a center of the first blade, or connecting lines between centers of the two deflection components and a center of the second blade, define a third angle, and the third angle is from 20 degrees to 230 degrees.

19. A lawn mower, comprising:

a housing;

a first blade mounted on the housing;

a second blade mounted on the housing, the first blade and the second blade being staggered and arranged back and forth;

a grass discharging passage, arranged in the housing;

a first motor driving the first blade;

a second motor driving the second blade;

a closing component detachably connected to the grass discharging passage and to close or open the grass discharging passage;

a sensing device arranged in the grass discharging passage to detect whether the closing component is mounted in the grass discharging passage or not, wherein when the closing component is detected, the first blade and the second blade rotate at a same rotation speed, and when the closing component is not detected, the rotation speed of the first blade is different from the rotation speed of the second blade.

* * * * *